United States Patent [19]

Hochhauser et al.

[11] 4,371,560

[45] Feb. 1, 1983

[54] SEAFOOD PRODUCT AND METHOD OF PRODUCING SAME

[75] Inventors: Arthur Hochhauser, Allentown, Pa.; Richard B. Jackson, Brooklyn, N.Y.

[73] Assignee: DCA Food Industries, New York, N.Y.

[21] Appl. No.: 318,388

[22] Filed: Nov. 5, 1981

Related U.S. Application Data

[63] Continuation of Ser. No. 138,137, Apr. 7, 1980, abandoned.

[51] Int. Cl.³ .................... A22C 25/00; A22C 29/02
[52] U.S. Cl. .................................. 426/643; 426/646; 426/513; 426/802
[58] Field of Search ............... 426/104, 574, 643, 645, 426/646, 513, 516, 802

[56] References Cited

U.S. PATENT DOCUMENTS

| | | | |
|---|---|---|---|
| 3,047,395 | 7/1962 | Rusoff et al. | 426/104 |
| 3,493,391 | 2/1970 | Pottie | 426/643 |
| 3,615,686 | 10/1971 | Marshall | 426/643 X |
| 3,650,766 | 3/1972 | Smadar | 426/516 X |
| 3,712,821 | 1/1973 | Ronsivalli et al. | 426/643 X |
| 3,852,487 | 12/1974 | Van Werven et al. | 426/643 |
| 3,852,505 | 12/1974 | Rubin | 426/513 X |
| 3,863,017 | 1/1975 | Yueh | 426/513 X |
| 3,891,776 | 6/1975 | Carpenter et al. | 426/276 X |
| 4,092,435 | 5/1978 | Teijeiro | 426/643 X |
| 4,126,704 | 11/1978 | McCarthy et al. | 426/643 X |

FOREIGN PATENT DOCUMENTS 635953  12/1978  U.S.S.R. ............................ 426/643

Primary Examiner—Robert A. Yoncoskie

[57] ABSTRACT

Seafood products, such as shrimp, may be produced in any desired shape by a process which includes the steps of mechanically working small pieces of a selected seafood under vacuum, to form a shapeable mash having textural and eating characteristics comparable to those of the selected seafood in its natural form. In a preferred method, the seafood pieces are mechanically worked under vacuum and a matrix mix comprising a cookable binder is thereafter carefully folded-in to the worked seafood pieces under vacuum to thereby yield a shapeable mash which can be extruded or molded, to produce seafood products having highly desirable texture and eating characteristics.

8 Claims, No Drawings

SEAFOOD PRODUCT AND METHOD OF PRODUCING SAME

This application is a continuation of application Ser. No. 138,137, filed Apr. 7, 1980, now abandoned.

FIELD OF THE INVENTION

This invention relates generally to processed seafood products and methods for their production and, more particularly, to a method for producing a seafood product in a desired shape from constituent pieces or scraps of the natural seafood. In a preferred embodiment, the invention relates to an improved shrimp product and its method of manufacture.

Methods for producing food products in a desired shape by processing constituent pieces of a natural food so as to form them into a desired shape are known in the art. For example, commonly assigned U.S. Pat. Nos. 3,650,765, 3,650,766 and 4,126,704 disclose methods which have been used commercially to manufacture shrimp-shaped products by mixing small pieces of shrimp with a matrix mix consisting essentially of starch, flour, algin gum and seasonings. In accordance with those patents, the matrix and shrimp are mixed together; extruded in an appropriate shape; contacted with a calcium chloride solution to form a shape retaining skin; battered, breaded and fried. The resulting products have an interior that is composed of pieces of shrimp embedded in matrix which somewhat emulate the texture and eating qualities of a natural fried shrimp product but lack the uniform cohesiveness, rubberiness and flakiness common to natural shrimp.

A variety of methods have been described in the prior art for improving the texture and eating characteristics of seafood products, and particularly shrimp products, made from tiny shrimp or shrimp pieces. Many of these prior art methods are based upon techniques for breaking up muscle fiber containing protein by mechanical or chemical means or combinations thereof so that a more coherent final product is obtained which exhibits the rubberiness, flakiness and other textural properties associated with natural shrimp or other seafood products. For example, U.S. Pat. Nos. 3,493,391 and 3,712,821 both relate to production of seafood products from pieces or scraps of fish. The '391 patent requires that the starting fish pieces be comminuted under temperature conditions not exceeding 5° C. whereas the '821 patent requires the formulation of a binder paste from the fish under defined conditions and the mixing of the fish paste with the fish pieces prior to formation of a final product.

U.S. Pat. No. 3,852,505 discloses a process for preparing shrimp from very small shrimp pieces by a series of precise tempering, braying, agitation and decomposition steps under carefully controlled conditions.

Yet another process for producing shrimp from shrimp pieces is described in U.S. Pat No. 4,092,435 and involves a combination of mechanical agitation and the addition of small amounts of sodium tripolyphosphate to shrimp pieces.

The preparation of fish cakes known popularly in Japan as "Kamaboko" is described in *Marine Fisheries*, Vol. 35, December, 1973, and also includes a detailed series of mechanical processing steps including frequent washing, pressing, chopping and grinding of the various ingredients prior to producing the finally shaped product.

Although applicants have found that the use of mechanical agitation techniques, as described in the prior art provides a degree of improvement in the texture of shrimp products made from comminuted food particles, the results obtained leave further room for improvement. Moreover, applicants have discovered that the application of such texture improvement techniques to processes for the production of shaped products which also employ a matrix mix i.e. processes of the type described in commonly assigned U.S. Pat. No. 3,650,766 and the like, produces a serious problem with respect to burst-out, i.e., explosive disintegration, of the products during cooking steps which are normally applied during production and/or final preparation of such products. This tendency of products to burst apart upon cooking is unacceptable from both a yield and safety standpoint.

SUMMARY OF THE INVENTION

The present invention provides a relatively low cost and expeditious method for producing a homogeneous seafood product, and particularly a shrimp product, in a desired shape, which exhibits texture and eating characteristics which are comparable to a natural seafood product of similar size and shape. It has now been discovered that by applying a vacuum to the shrimp pieces while they are being mechanically worked or immediately thereafter, a shrimp product having an unexpected increase in rubberiness and flake characteristic is produced. The effect of applying a vacuum on the texture and eating qualities of the shrimp product were unexpected since vacuum mixing techniques known in the prior art, e.g. vacuum stuffers used in the sausage industry for deaerating meat fillings, are used to minimize air occlusion or foaming of products and cause no significant texture improvement.

Although the application of vacuum during mechanical working of the seafood pieces produces an unexpected improvement in the overall texture and eating qualities of extruded seafood products, it does not, by itself, eliminate the burst-out problem associated with the production of extruded products so treated although it does exhibit some tendency to reduce that problem. It has now been discovered that burst-out can be drastically reduced, if not eliminated, by performing the aforesaid vacuum mixing step in the absence of any additional ingredients, i.e., matrix mix or the like. Matrix mix is added to the comminuted seafood pulp only after the previously described vacuum—agitation procedure has been completed. Matrix mix is then incorporated into the seafood pulp under vacuum and only to the extent necessary to generally distribute the matrix in the comminuted shrimp pieces rather than to uniformly disperse the matrix so as to form a homogeneous mash. It is presently believed that the burst-out problem is somehow related to the formation of an encapsulating film structure as a result of a thermally induced reaction involving seafood protein and carbohydrates contained in the matrix mix in such manner that an internal pressure is developed in the extruded food product which, during the cooking or frying steps, builds up to a point where it ruptures the film with explosive force. By avoiding homogeneous distribution or dispersion of the matrix, it is believed that discontinuities are created in the strength of the film structure so that pressure may escape in a nonexplosive manner while still providing sufficient film forming capability to assist in release of the products from the extruder and to maintain the shape of those products. Other explanations as to why the foregoing techniques result in the substantial reduction of the burst-out problem may occur to those skilled in the art and, accordingly, the invention is not limited to any particular theory of operation.

DETAILED DESCRIPTION OF THE INVENTION

The basic method of the invention comprises the step of mechanically working pieces or scraps of a selected seafood under vacuum conditions for a particular time and at a working rate sufficient to at least partially break up muscle fiber and produce a coherent mass of protein, and the subsequent steps of distributing the matrix mix in the seafood pulp under vacuum. The matrix-containing mash can then be formed into a desired shape by conventional forming techniques such as molding or extrusion.

The foregoing process is applicable to a wide variety of seafood products having discrete textural properties including cod, mullet, perch, krill and preferably, shrimp, and may be applied to small pieces or scraps of the foregoing materials or to tiny naturally occurring products such as 300/500 count per pound shrimp. Irrespective of the seafood selected, the starting material, preferably in a comminuted state, is placed in a high speed vacuum agitator. Comminution of the starting pieces prior to agitation, as by dicing or grinding, is not necessary to effectively practice the present invention but is preferred, unless the starting pieces are small, since such comminution will insure more complete mechanical working of the starting pieces.

Table I below sets forth both broad and preferred ranges for the significant operating conditions during the vacuum step:

TABLE 1

| Process Variable | Broad Range | Preferred Range | Most Preferred Range |
| --- | --- | --- | --- |
| Agitation time, minutes | 2–50 | 3–20 | 3–10 |
| Agitation speed, RPM | 50–600 | 100–300 | 130–200 |
| Vacuum, inches of Hg. | 1–30 | 25–30 | 28–30 |
| Work input (watt hrs/lb) | 10–100 | 15–90 | 25–70 |

From the above table it is evident that the vacuum level should be maintained as close to a perfect vacuum as possible. It should be noted that this theoretical upper limit will vary somewhat from the table value of 30 inches depending upon the ambient barometer pressure.

It will be apparent to those skilled in the art that both the amount of work input and the degree of vacuum will affect the texture and eating characteristics of the final product and that variations may occur within the broad range set forth in Table 1, depending upon the nature of the seafood starting ingredient. Preferred equipment for carrying out the foregoing process includes whisk-type mixers modified for vaccum operation or Day turbulent vacuum mixers. Moreover, while it is preferred to carry out the agitation step under vacuum the process, it may also be carried out by agitation under atmospheric pressure conditions within the same working rate input limits described above, and then subsequently deaerating the pulp by passing it through a conventional degassing pump under conditions designed to achieve the same density of pulp as would be achieved by simultaneous application of a vacuum during the agitation step.

Although the homogeneous pulp resulting from the foregoing vacuum agitation operation may be conventionally molded, extruded or otherwise formed into a desired shape, e.g., jumbo shrimp, the present invention, in its preferred form, contemplates the use of the processes described in commonly assigned U.S. Pat. Nos. 3,650,765; 3,650,766 and 4,126,704 the disclosures of which are incorporated herein by reference. It has been found that the use of the foregoing processes, all of which involve the formation of a shape retaining skin as a result of a reaction between alginate in the matrix mix and a calcium wash solution, are preferred since the matrix mix enhances the overall texture of the products and the skin-forming techniques greatly facilitate the high speed production of products having a uniform size and shape.

As described in U.S. Pat. No. 3,650,766, the matrix mix includes a cookable binder such as corn flour, rye flour, rice flour and, preferrably wheat flour; an alginate, such as sodium alginate; and a wide variety of other ingredients intended to improve the texture or flavor of the final product including starches, albumins, sodium phosphates, salt, MSG, vegetable protein, sucrose and other flavoring agents the selection of which will depend upon the particular seafood product being extruded. A typical matrix mix for use in the production of extruded shrimp contains the following range of ingredients:

TABLE 2

| | |
| --- | --- |
| Corn Starch | 36–40 wt. % |
| Wheat flour | 32–35 |
| Sodium Alginate | 4–6 |
| Sugar | 2–4 |
| Salt | 3–5 |
| Egg Albumin | 8–12 |
| Flavorings | 2–3 |
| Sodium Tripolyphosphate | 2–3 |
| Triacetin | 0.1–1 |

It will be readily apparent that the foregoing materials and amounts are not critical and may be widely varied without affecting the basic nature of the invention disclosed herein.

The amount of matrix mix which is combined with the seafood pulp is also not critical and may vary over a broad range. For example, in the manufacture of a shrimp product in accordance with the invention the shrimp will comprise 72–92 wt % of the final product, preferably 75–85 wt %, the balance being matrix mix.

As previously noted, when and how the matrix mix is added to the comminuted seafood pieces is critical with respect to the degree of burst-out which will be experienced when products made in accordance with the invention are cooked or fried. Since the products of the present invention are normally not cooked for a sufficient time during the manufacturing process to result in burst-out during manufacturing, burst-out represents a substantial safety hazard to both institutional users and retail customers since significant injury could result from flying pieces of product and/or fat spattering if adequate precautions are not taken.

With respect to timing, it is critical that no matrix mix be added to the comminuted seafood pieces until the vacuum-agitation procedures contemplated by the present invention are completed. Thereafter, the matrix mix may be added to the seafood pulp. However, in incorporating the matrix mix in the seafood pulp, care must be taken to avoid the type of uniform dispersion of matrix mix in the seafood pulp which would result from addition of the matrix mix to the seafood pieces prior to vacuum agitation. Experimental evidence demonstrates that such pulps produce high burst-out frequencies. Furthermore, incorporation of the matrix mix in the seafood pulp shall also be carried out under vacuum so that the benefits of vacuum which are obtained during the agitation steps are not undone. Accordingly, the preferred technique for addition of the matrix mix to the seafood pulp is a "fold-in" method i.e., incorporation of the matrix into the pulp under vacuum by repeated overturning without significant stirring or beating. The amount of mixing will be sufficient to just wet the matrix mix and distribute it through the mash in such a manner that matrix mix is still identifiable as a separate ingredient upon visual inspection subsequent to the fold-in procedure. The optimum time for "folding-in" is that minimum time required to distribute the matrix mix in the seafood pulp sufficiently that, in the subsequent forming/extruding steps of the process, a continuous alginate gel skin is formed on the application of a calcium chloride solution. The fold-in procedure can be accomplished utilizing vacuum mixing equipment which is capable of distributing the matrix in the seafood pulp without homogenizing the mixture, e.g., a vacuum whisk mixer or Day mixer, and can normally be accomplished in a period of 30 second to 6 minutes, preferably 1 to 4 minutes, most preferrable 2 minutes or less. The acceptable and preferred vacuum limits are identical to those given in Table 1 with respect to the vacuum agitation step.

In the case of shrimp products, it has been found that the density of the matrix containing mash upon completion of the vacuum mixing and fold-in procedures is greater than 1.05 grams per cc., preferrable 1.08 grams per cc.

The foregoing matrix containing mash is then extruded or molded into the desired shape, e.g., a jumbo shrimp shape, and washed with a calcium ion containing solution to form an alginate gel skin on the surface of the formed food product. The formed food product may then be subjected to conventional processing to produce a finished product. Specifically the formed food product may, if desired, be coated with a batter and breading; partially cooked or fried to set the coating and the mash; and thereafter frozen and packaged for sale to consumers who will further cook the product prior to consumption. Alternatively, the coating and/or initial cooking steps can be omitted. In any event, the ultimate finished product will exhibit a rubberiness, flakiness and other textural properties which more closely simulate the consumer's expectation of the texture and taste of a natural jumbo shrimp.

The invention will be further understood by the following illustrative example:

EXAMPLE 1

Two samples of shrimp were prepared. Both utilized the same 300/500 count peeled undeveined Indian "titi" shrimp; the matrix formula of Table 2; a weight ratio of shrimp to matrix of 4.5:1; and the same batter and breader coating mixes.

Sample A was made according to the conventional DCA process described in U.S. Pat. No. 3,650,765 in which shrimp were ¼ inch-diced; the shrimp was then blended with matrix for one minute at low speed and two minutes at high speed using a Hobart paddle mixer; the mash was extruded; (1½" cutter/11 gm. pieces) battered; breaded; prefried for 30 seconds; and frozen at −20° F. for several days.

Sample B was made according to the method of the present invention. Shrimp was ground and then whisk-worked under vacuum (29.5 inches) for 4 minutes at high speed. Matrix was then added to the shrimp pulp and folded-in under vacuum for 2 minutes. The mash was extruded; battered and breaded; prefried and stored in exactly the same way as Sample A.

In preparation for the test panel, both samples were reconstituted by deep-fat frying for two minutes. Panelists were asked to rate samples A and B for resistance to bite, cohesiveness, springiness and overall texture quality. In all four attributes Sample B rated significantly higher at the 90% confidence level.

EXAMPLE 2

A series of experiments were conducted to determine both the effect of vacuum and the effect of the manner in which matrix is added to mechanically worked shrimp on burst-out frequency during subsequent cooking. In Run A shrimp pieces were mechanically worked in a 43 gallon commercial (Day) mixer operated for 14 minutes at 27 inches of vacuum in the absence of added matrix mix. Run B was identical to Run A except that the vacuum was maintained at 21 inches. Following the vacuum agitation procedure matrix mix was "folded-in" under the vacuum conditions and for the times listed in the tabulation below. At the conclusion of each time period a portion of the mash was removed for extrusion and the "fold-in" procedure was then continued on the remaining mash for the additional time period shown. All of the products were extruded into a 30/40 count shrimp shape; treated with a calcium wash solution; battered and breaded; deep-fat fried for 30 seconds at 375° F.; frozen at −20° F. for 48 hours; and reconstituted by deep-fat frying at 375° F. for 5 minutes. The results are set forth below:

| Total Fold-in Time (min) | Mash Density | Percentage of Burst-Out Pieces |
|---|---|---|
| Run A (27" Vacuum) | | |
| 1 | 1.07 | 0 |
| 2 | 1.07 | 13 |
| 7 | 1.07 | 13 |
| Run B (21" Vacuum) | | |
| 0.5 | 1.07 | 13 |
| 1 | 1.07 | 50 |
| 2 | 1.07 | 56 |
| 7 | 1.07 | 69 |

In a separate laboratory experiment a batch of comminuted shrimp containing 18.3 wt % matrix was mechanically worked for 6 minutes at atmospheric pressure; extruded; washed with calcium ion solution; and fried at 400° F. The burst-out frequency was 67%. The experiment was then repeated except that the shrimp pieces were worked for four minutes in the absence of any matrix and the matrix was then folded in for 2 minutes. The burst-out frequency was 0. The results clearly indicate that the degree of vacuum applied; the point at which matrix mix is added; and the extent of mixing after matrix is added all have an effect on burst-out frequency.

EXAMPLE 3

An experiment was run in which three samples were prepared. All three samples were prepared from 300/500 count peeled, undeveined Indian "titi" shrimp and the same standard matrix (shrimp to matrix ratio=4.5:1). Shrimp was ⅜" ground previous to mixing.

Sample A: ground shrimp was blended with matrix with a paddle for 1 minute at low speed and 2 minutes at high speed.

Sample B: ground shrimp was whisk-mixed with matrix (at atmospheric pressure) for 1 minute at low speed and 4 minutes at high speed.

Sample C: same as Sample B except mixing done under vacuum.

The mash samples were hand-molded into shrimp shapes; battered and breaded; prefried for 30 seconds and frozen. Prior to submitting samples to the sensory panel, pieces were deep-fat fried for two minutes.

Samples were evaluated for overall texture quality and for cohesiveness.

Whereas no significant differences between Sample A and Sample B were distinguished by the panel, significant differences at the 90% confidence level were distinguished between Sample A and Sample C. Therefore it was shown that the application of vacuum even without agitation imparts improved texture.

In another experiment, two samples were prepared according to the mechanical agitation method described in this application except that the mash for Sample B was prepared at 29.5 inches vacuum. The deep-fat fried samples were instrumently evaluated for cohesiveness. According to this method, a cone penetrometer is used to measure depths of penetration into the reformed shrimp. Sample B gave significantly lower penetration values (at the 90% confidence level) than Sample A thereby establishing that the application of vacuum resulted in greater cohesiveness.

From the foregoing it will be appreciated that the present invention overcomes a number of difficulties previously encountered in carrying out known processes for producing seafood products from constituent pieces or scraps thereof and results in the production of improved products.

We claim:

1. A method of producing a seafood product which comprises the steps of providing pieces of a natural seafood, mechanically working the natural seafood pieces for a time and at an energy rate sufficient to at least partially break up muscle fiber present in the natural seafood pieces and to produce a coherent mass of protein as a homogeneous pulp, said mechanically working is carried out while applying a vacuum, said vacuum being in the range of 25 to 30 inches of mercury, and forming said pulp into a shaped product.

2. The method of claim 1, further including the step of comminuting said seafood pieces prior to mechanically working said pieces.

3. The method of claim 1, wherein said seafood is shrimp.

4. The method of claim 1 further including the step of combining a matrix material with said pulp subsequent to mechanically working said pieces and prior to forming said pulp into said desired shape, said matrix material being folded into said pulp under vacuum, said matrix material being distributed throughout said pulp but being visually identifiable as a separate ingredient, said matrix material being selected from the group comprising starch, flour, alginate and mixtures thereof.

5. In a method of producing a seafood product in a desired shape which comprises the steps of mechanically working pieces of the seafood for a time and at an energy input rate sufficient to at least partially break up muscle fiber and produce a coherent mass of protein as a homogeneous pulp and forming said pulp into said desired shape, the improvement which comprises applying a vacuum to said pieces during said mechanical working step, thereafter, and prior to forming said pulp in a desired shape, folding in under vacuum a matrix material with said pulp, said matrix material being distributed throughout said pulp but being visually identifiable as a separate ingredient, said matrix material being selected from the group consisting of starch, flour, alginate and mixtures thereof.

6. The method of claim 5, wherein said seafood is shrimp.

7. The method of claim 6, wherein said shrimp comprises 72 to 92 weight percent of said matrix containing pulp.

8. The method of claim 7, wherein the applied vacuum is in the range of 25 to 30 inches mercury.

* * * * *